United States Patent Office 2,918,363
Patented Dec. 22, 1959

2,918,363

AGRONOMICAL PRACTICE EMPLOYING 1,4-DICHLORO-2-BUTYNE FOR THE CULTURE AND PROTECTION OF CROPS

George O. Turner, Long Beach, Calif., assignor to The Dow Chemical Company, Midland, Mich., a corporation of Delaware No Drawing. Application August 2, 1954
Serial No. 447,399

13 Claims. (Cl. 71—2.7)

The present invention relates to the culture and protection of crops and is particularly concerned with a new agronomical practice and composition for stimulating plant growth and improving the growth and harvest of crop plants.

The introduction of synthetic organic chemicals into the soil has been employed for the protection of crops against attack by soil organisms and the stimulation of plant growth. However, the utilization of such a method has been most generally hampered by the relatively low efficiency of many suggested materials when employed in clay type soils. Others of the known materials have been restricted in use by their selectivity and consequent failure to accomplish a desirable result on more than a very few varieties of crop plants. Thus, an agronomical practice which would benefit a large variety of plants when raised on silt, sand or clay loam soils would be of a distinct advantage to the agriculturist.

It is an object of the present invention to provide a new and improved agronomical practice for the culture of corps. A further object is to provide an improved practice for benefiting a large variety of crops raised on sand, silt or clay loam soils. Another object is the provision of a method for the treatment of soil which will accomplish the stimulation of the growth of crops subsequently planted therein. An additional object is the provision of a practice for protecting the roots of plants from the attack of soil-dwelling nematodes including sugar beet nematodes. A further object is the provision of a novel composition adapted to be employed in the new practice for growing crops. Other objects will become apparent from the following specification and claims.

The new agronomical practice comprises treating soil or growth media with 1,4-dichloro-2-butyne to benefit plants grown in the treated soil. Such practice protects the plants from the ravages of soil-dwelling nematodes which attack their roots and improves the growth and harvest of crop plants. It has been further found that the treatment with 1,4-dichloro-2-butyne accomplishes changes in the soil which stimulate the growth and improve the growth characteristics of crops grown therein. Thus, for example, crops raised on treated soil have more luxuriant tops and roots and are of a greater total weight than those normally obtained from untreated soil.

1,4-dichloro-2-butyne is a mobile liquid boiling at 70° C. at 22 millimeters pressure, somewhat soluble in many organic solvents and of low solubility in water and is adapted readily and conveniently to be distributed in soil or growth media. Further, when so employed the compound accomplishes a rapid control of nematodes such as root-knot nematodes and sugar beet nematodes, and induces soil changes which improve the growth characteristics of crops grown in the treated soil. It is among the advantages of the present invention that these desirable and beneficial results are obtained in sand, silt and clay type soils. It is a further advantage that the compound, while sufficiently persistent to accomplish the desired effect upon soil-dwelling nematodes or to achieve the changes in the soil which accomplish improved growth characteristics, dissipates in a reasonable period of time. Yet another advantage is that the butyne compound permeates soil for a distance of several inches from the point of application, depending upon the temperature, moisture content, compactness, and physical consistency of the soil or growth medium.

The distribution of an effective dosage of 1,4-dichloro-2-butyne in soil or growth media is essential for the practice of the present invention. In general, good controls of nematodes are obtained when the compound is distributed in the soil in the amount of from 0.5 to 150 parts or more by weight per million parts by weight of the soil. Where improved growth characteristics of crops are concerned, these concentrations are preferred, although lower concentrations are sometimes effective. In field applications, the butyne compound may be distributed in the soil at a dosage of from 0.4 to 150 or more pounds per acre and through such a cross-section of the soil as to provide for the presence therein of an effective concentration of the treating agent. In such applications, it is desirable that the compound be distributed to a depth of at least 2 inches and at a dosage of at least 0.2 pound per acre-inch of soil. In other applications, it may be preferred that the compound be distributed through that cross-section of the soil in which the roots of the plant are or will be found. When the treatment is carried out by injection or drilling technique to a depth of from 4 to 6 inches below the soil surface, it is preferred that the maximum distance between deposits be not materially in excess of 20 inches when the dosage is 20 pounds or more of toxicant per acre and not materially in excess of 6 inches when the dosage is 1.5 pounds per acre, such maximum distance between deposits being directly proportional to the dosage of 1,4-dichloro-2-butyne within the extremes recited.

In one embodiment of the invention, the treated soil is planted with the desired crop plant following the distribution of the butyne compound in the soil. Where minimum dosages of the butyne compound are distributed in soil, the treated soil may be immediately planted with the desired crop. Following the distribution of larger dosages of the butyne compound, it is desirable that any planting operation not be carried out for a period of from several hours to several days, the exact period depending upon the concentration of the butyne compound in the soil and the resistance of the species concerned to the compound. Wheer the compound is employed for the treatment of the soil adjacent to the root system of established plants having resistance to the butyne compound and in side-dressing operations, the existing vegetation is not unfavorably effected by minimum effective concentrations of the butyne compound temporarily present in the soil.

The method of the present invention may be carried out by distributing the unmodified 1,4-dichloro-2-butyne compound through the growth media as by impregnation. However, the present method also embraces the employment of a liquid or dust composition containing the toxicant. In such usage, the butyne compound may be modified with one or a plurality of additaments or soil treating or parasiticide adjuvants, including water or other liquid carriers, surface active dispersing agents and finely divided inert solids. Depending upon the concentration of toxicant such augmented compositions are adapted to be distributed in the soil, or employed as concentrates and subsequently diluted with additional inert carrier to produce the ultimate treating compositions. The required amount of the butyne compound in the growth media conveniently may be supplied per acre treated in from 1 to 27,000 gallons or more of the liquid carrier or in from about 20 to 2,000 pounds of the solid carrier.

The exact concentration of the butyne compound to be employed in compositions for the treatment of growth media may vary provided the required dosage of effective agent is supplied. The concentration of toxicant in liquid compositions employed to supply the desired dosage generally is from about 0.001 to 50 percent by weight, although compositions containing as high as 90 percent may be employed. In dusts, the concentration of toxicant may be from about 1 to 20 percent by weight. In compositions to be employed as concentrates, the toxicant may be present in a concentration of from about 5 to 95 percent by weight.

Liquid compositions containing the desired amount of the butyne compound may be prepared by dissolving the toxicant in an organic liquid such as acetone, toluene, methylene chloride, chlorobenzene and petroleum distillates or by dispersing the toxicant in water with the aid of a suitable surface active dispersing agent such as an ionic or non-ionic emulsifying agent. The preferred organic solvent carriers are those which are adapted to accomplish the penetration and impregnation of the soil with the butyne compound and are of such volatility that they evaporate from the soil which leave little permanent residue therein.

The aqueous compositions may contain one or more water-immiscible solvents for the butyne compound. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the butyne compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of the butyne compound. The petroleum distillates to be employed in such embodiment are carefully-cut portions boiling almost entirely under 400° F. at atmospheric pressure, having a flash point above about 80° F. and leaving very small residues on evaporation. These fumigant compositions are characterized by having excellent penetrating properties and by being of low fire hazard to the shipper and user.

In the preparation of dust compositions, the 1,4-dichloro-2-butyne is dispersed in and on a finely divided inert solid such as talc, chalk, gypsum and the like. In such operations, the carrier is mechanically ground with the compound or wet with a volatile organic solvent solution thereof. Similarly, dust compositions containing the compound may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

In another preferred embodiment, the butyne compound is dispersed on and in an exploded mica to produce compositions adapted particularly to be employed in operations where a gradual and prolonged release of the toxicant is desired. In preparing such compositions, a coarsely subdivided mica carrier is mixed or wet with the butyne compound and the resulting product thereafter packaged in air-tight containers to prevent loss of toxicant by volatilization prior to use. In compositions employed to supply the desired dosage, suitable proportions of toxicant are from about ¼ to 2 times the weight of the mica carrier.

A further preferred embodiment of the present invention is a novel composition comprising soil in admixture with an effective concentration of 1,4-dichloro-2-butyne.

When operating in accordance with the present invention, the soil may be impregnated with butyne compound or a composition containing the toxicant, in any convenient fashion, e.g. by simple mixing with the soil, by employing a liquid carrier to accomplish the penetration and impregnation, or by injection or drilling techniques whereby the toxicant is deposited beneath the surface of the soil. Where injection or drilling techniques are concerned, the soil may be blanketed to suppress the volatilization of the butyne compound therefrom. In general, it is desirable that the distribution be carried out at a soil temperature of 45° F. or higher since the effectiveness of the butyne compound may be somewhat reduced at lower temperatures.

In a preferred embodiment, the method of the present invention is carried out in soil having a moisture content of from about 50 to 100 percent of the moisture equivalent of the soil. When operating under such soil conditions, maximum improvements in crop yields and controls of nematodes are obtained. Thompson L. M. in Soils and Soil Fertility, McGraw Book Co., Inc. (1952) defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisure content and the moisture equivalent or field capacity of the soil in order to obtain the desired depth of distribution of the toxicant at a soil moisture content equal to the moisture equivalent. In such method, the butyne compound readily and conveniently may be distributed to a depth of from two to four feet to avoid reinfestation from deep-dwelling organisms.

The expression "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any substances or media in which vegetation may take root and grow, and are intended to include not only earth but compost, manure, muck, humus, and sand and the like, adapted to support plant growth.

The following examples illustrate the invention but are not to be construed as limiting the same:

Example 1

1,4-dichloro-2-butyne was dissolved in acetone to produce a composition containing 50 grams of the butyne compound per liter of ultimate mixture. This composition was employed for the treatment of a seed bed containing a sandy loam soil heavily infested with root-knot nematodes. At the time of treatment the soil had a moisture content of about 10 percent. This moisture content is about 60 percent of the moisture equivalent or field capacity of the soil. The distribution was accomplished by injecting the composition into the soils in rows 12 inches apart, the injections being made at 4 inch intervals and at a depth of about 6 inches below the soil surface. The amount of composition employed was sufficient to supply 5 pounds of 1,4-dichloro-2-butyne per acre. The latter dosage corresponds to a concentration of about 1.7 parts by weight of 1,4-dichloro-2-butyne per million parts by weight of soil. Following the distribution the average soil temperature remained at about 62° F. for the period of the determination.

Seven days after treatment, the soil was seeded with tomatoes, the seeded soil being that positioned about 6 inches from the loci of treatment. Untreated check plots were also planted with tomato seeds. During the subsequent growing period there was observed no adverse effect upon the germination and growth of seedlings attributable to the presence of residual butyne compound. Four weeks after seeding, the plants were lifted from the soil and the roots washed and examined for gall formation attributable to nematode attack. The examination indicated a 99 percent control of nematodes in the treated soil with heavy infestation in the check plots.

*Example 2*

In an exactly comparable operation, beds of the same nematode-infested, sandy loam soil were separately treated with acetone solutions containing 400, 300, 200, 150, 100 and 75 grams of 1,4-dichloro-2-butyne per liter of ultimate composition and at dosages, respectively, of 40, 30, 20, 15, 10 and 7.5 pounds of butyne compound per acre. These dosages correspond, respectively, to concentrations of about 13.6, 10.2, 6.8, 5.1, 3.4 and 2.5 parts by weight of 1,4-dichloro-2-butyne per million parts by weight of soil. At the time of treatment the soil had a moisture content of about 10 percent, the latter being about 60 percent of the moisture equivalent or field capacity of the soil. Following the treatment, the average soil temperature remained at about 62° F. for the period of the determination.

One week after treatment the soil was seeded with tomatoes, the seeded soil being that positioned about 6 inches from the loci of treatment. Untreated check plots were also planted with tomato seeds. During the growing period there was observed no adverse effect upon the germination and growth of seedlings attributable to the presence of residual butyne compound. Four weeks after seeding, the plants were lifted from the soil and the roots washed and examined for gall formation attributable to nematode attack. The examination indicated that a 100 percent control of root-knot nematodes had been obtained in all soil plots which had been treated with 1,4-dichloro-2-butyne. In the check plots, the plants were found to be dwarfed and their roots covered with galls attributable to nematode attack.

*Example 3*

1,4-dichloro-2-butyne is dissolved in a low-boiling petroleum hydrocarbon fraction (Stoddard's solvent) to produce a composition having a flash point greater than 100° F. and containing about 30 percent by weight of butyne compound. The hydrocarbon solvent has a boiling range of from about 312° to about 390° F. and a flash point of about 116° F. This composition is employed for the treatment of a soil of good nutrient content heavily infested with sugar beet nematodes. The soil consists of a loam containing about 25 percent clay, 49 percent silt and 26 percent sand. At the time of treatment, the soil which has a moisture equivalent of about 20 percent, contains about 15 percent by weight of water. In the treating operations the butyne composition is drilled into the soil in rows 12 inches apart and at a depth of about 7 inches below the soil surface. The amount of composition employed is sufficient to supply 12.5 pounds of 1,4-dichloro-2-butyne per acre. About 2 weeks after treatment the soil plot is seeded with sugar beets. Untreated check plots are also planted with sugar beets. About 10 weeks after seeding, plants are selected at random in the treated and untreated areas, lifted from the soil, the roots washed and thereafter examined in order to determine the presence or absence of disease. The examination indicates that a substantially complete control of sugar beet nematodes is obtained in the treated soil. In the check plots the plants are found to be severely dwarfed and stunted from the attack of sugar beet nematodes and about ½ the size of the plants from the treated soil.

*Example 4*

An acetone solution containing 50 grams, 1,4-dichloro-2-butyne per liter of solution was employed for the treatment of a sandy loam soil heavily infested with root-knot nematodes. In such operations, the soil was placed in sealable containers and thereafter treated with the composition at a dosage of 50 pounds per acre foot. At the time of treatment, the soil had a moisture content of about 7 percent, the latter being about 50 percent of the field capacity. In the treating operations, the distribution was accomplished by injection to give a concentration of about 12 parts by weight of the butyne compound per million parts by weight of soil. The containers of treated soil were then sealed and set aside for about one week.

Following the latter period, the containers were unsealed, and the treated soil allowed to aerate for about one week and thereafter planted with tomato seeds. Untreated check plots of the same soil were also planted with tomato seeds. During the subsequent growing period there was observed no adverse effect upon the germination and growth of seedlings attributable to the presence of residual butyne compound. About five weeks after planting, the plants were lifted from the soil and the roots washed and examined for evidence of nematode attack. The examination of the plants indicated a 100 percent control of nematodes had been obtained in the treated soil with heavy infestation in the check plots.

*Example 5*

25 parts by weight of 1,4-dichloro-2-butyne, 65 parts of xylene and 10 parts of an alkyl aryl sulfonate (Acto 700) are mechanically mixed together to obtain a concentrate composition in the form of an emulsifiable liquid. In a further operation, 50 parts by weight of 1,4-dichloro-2-butyne, 45 parts by weight of xylene and 5 parts by weight of a dimeric alkylated aryl polyether alcohol (Triton X-155) are mixed together to prepare an emulsifiable concentrate composition.

Also, 90 parts by weight of 1,4-dichloro-2-butyne and 10 parts of a sorbitan mono-laurate polyoxyethylene derivative (Tween 20) are mechanically mixed together to prepare a water-dispersible concentrate composition.

These compositions are adapted to be dispersed in water to produce aqueous compositions having very desirable wetting and penetrating properties. The latter compositions are adapted to be employed to treat soil and distribute 1,4-dichloro-2-butyne therein in effective concentrations.

*Example 6*

The water dispersible concentrate composition of Example 5 is dispersed in water to prepare a composition containing about 100 pounds of 1,4-dichloro-2-butyne per 200 gallons of ultimate mixture. The latter composition, while under agitation, is metered into irrigation water at the pump outlet at the rate of 2 gallons per 1000 gallons of irrigation water. The water is in a state of turbulent flow as it comes from the pump which provides for the thorough mixing of the toxicant therein. About 3 acre inches of irrigation water is applied to land heavily infested with root-knot nematodes to accomplish a wetting of the soil to a depth of about 18 inches. A few weeks after the treatment the soil is planted with tomato seeds. Eight weeks after the seeding the resulting stand of tomato plants is examined and found to be substantially free of nematode attack.

Example 7

In a determination as described in Example 4, sandy loam soil heavily infested with root-knot nematodes was treated with acetone solutions containing 5, 2.5 and 1 gram of 1,4-dichloro-2-butyne per liter of ultimate composition and at dosages, respectively, of 10, 5 and 2 pounds, respectively, of butyne compound per acre-foot of soil. These dosages correspond, respectively, to concentrations of about 2.3, 1.1 and 0.46 parts by weight of 1,4-dichloro-2-butyne per million parts by weight of soil. In the treating operations, the soil was placed in sealable containers, the compositions injected into the soil and the containers of treated soil thereafter sealed and set aside for about one week at 25° C. At the time of treatment the soil had a moisture content of about 7 percent, the latter being about 50 percent of the moisture equivalent of the soil.

After the week period, the containers of treated soil were unsealed and the soil allowed to aerate for about one week and thereafter planted with tomato seeds. Untreated check plots of the same soil were also planted with tomato seeds. During the subsequent growing period there was observed no adverse effect upon the germination and growth of seedlings attributable to the presence of residual butyne compound. Eight weeks after planting, the plants were lifted from the soil and the roots washed and examined for evidence of nematode attack. The examination of the plants indicated that a 100 percent control of nematodes had been obtained in the soil containing 2.3 and 1.1 parts by weight of 1,4-dichloro-2-butyne per million parts by weight of soil. In the soil containing 0.46 part by weight of the butyne compound per million parts by weight of soil, there was found a 90 percent control of nematodes. At the time of observation the plants in the check plots were found to be dwarfed and their roots covered with galls attributable to nematode attack.

Example 8

An acetone solution containing 2.5 grams of 1,4-dichloro-2-butyne per liter of solution was employed for the treatment of the nematode-infested soil of Example 7. In such operations, the soil was placed in sealable containers and thereafter treated with the composition at a dosage of 5 pounds per acre foot. In the treating operation, the distribution was accomplished by injection to give a concentration of about 1.1 parts by weight of the butyne compound per million parts by weight of soil. The containers of treated soil were then sealed and set aside for seven days.

Following the latter period, the containers were unsealed and samples of treated soil and untreated check soil were examined microscopically and counts of nematodes made in order to determine the percent control of this organism. The examination indicated that a 97 percent control of root-knot nematodes had been obtained in the treated soil.

Example 9

1,4-dichloro-2-butyne was dissolved in acetone to prepare compositions containing 2.5, 25 and 100 grams of the butyne compound per liter of solution and the solutions thereafter dispersed in water to prepare aqueous compositions containing, respectively, 0.5, 5 and 20 parts by weight of butyne compound per million parts by weight of ultimate mixture. These aqueous compositions were applied about the roots and accompanying soil bed of lemon trees as a soil drench and at dosages, respectively, of about 0.135, 1.35 and 5.4 parts by weight of the butyne compound per million parts by weight of the soil bed about the roots of the trees. Three months after the treatments the lemon trees were examined and no adverse effect upon growth attributable to the treatments was observed.

Example 10

A 35 percent by weight solution of 1,4-dichloro-2-butyne in Standard Thinner 250 is employed for the treatment of one-half of a field containing a clay loam soil. Standard Thinner 250 is a petroleum hydrocarbon fraction boiling at from 192° to 272° F. The treatment is carried out by drilling technique whereby the composition is introduced at a depth of 6 inches and in rows spaced 14 inches apart. The amount of composition employed is sufficient to supply 50 pounds of 1,4-dichloro-2-butyne per acre. At the time of treatment the soil has a moisture content of about 20 percent, the latter being about 80 percent of the field capacity of the soil.

Two weeks after treatment the entire field is seeded to carrots. During the subsequent growing period there is observed no adverse effect upon the germination and growth of the crop attributable to the presence of residual butyne compound. Toward the end of the growing season the foliage and tops of the carrots in the treated portion of the field are observed to be more lush and bountiful than those in the untreated area. At harvest, the yield of carrots taken from the treated field is found to be substantially greater than that from the untreated soil.

I claim:

1. An agronomical practice which comprises impregnating soil with 1,4-dichloro-2-butyne in the amount of at least 0.5 part by weight per million parts by weight of soil and thereafter planting the treated soil.

2. An agronomical practice which comprises impregnating soil with a nematacidal amount of 1,4-dichloro-2-butyne and thereafter planting the treated soil.

3. A method for stimulating the growth of crop plants which comprises impregnating soil with 1,4-dichloro-2-butyne and thereafter planting the treated soil with the desired crop plant, the impregnation being carried out at a substantially uniform rate of at least 0.4 pound per acre and at a dosage of at least 0.5 part by weight per million parts by weight of soil.

4. In the practice of plant husbandry, the method which comprises impregnating soil with 1,4-dichloro-2-butyne in the amount of at least 0.5 part by weight per million parts by weight of soil.

5. In the practice of agricultural economy, the method which comprises impregnating field soil with a composition made up of 1,4-dichloro-2-butyne in intimate admixture with an inert soil treating adjuvant as a carrier therefor, the impregnation being carried out so as to provide at least 0.5 part by weight of the butyne compound per million parts by weight of soil.

6. A method as claimed in claim 4 wherein the soil is impregnated with a composition comprising a petroleum distillate solution of 1,4-dichloro-2-butyne.

7. An agronomical practice which comprises impregnating field soil with 1,4-dichloro-2-butyne at a substantially uniform dosage of at least 0.4 pound per acre, the impregnation being carried out through such a cross-section of the soil as to provide for the presence therein of at least 0.5 part by weight of the butyne compound per million parts by weight of soil.

8. A method claimed in claim 4 wherein the soil at the time of treatment with the butyne compound has a moisture content of from 50 to 100 percent of the moisture equivalent of said soil.

9. A composition comprising at least 0.001 percent by weight of 1,4-dichloro-2-butyne in intimate admixture with a solution of an emulsifying and dispersing agent as a carrier therefor.

10. A composition comprising at least 1 percent by weight of 1,4-dichloro-2-butyne in intimate admixture with an inert finely divided solid as a carrier therefor.

11. A composition comprising a petroleum distillate solution of 1,4-dichloro-2-butyne, the petroleum distillate being a carefully cut portion boiling almost entirely under 400° F. at atmospheric pressure and having a flash point above 80° F.

12. A concentrate composition comprising at least 5 percent by weight of 1,4-dichloro-2-butyne in intimate admixture with a surface active dispersing agent.

13. The method of treating soil to improve its ability to support plant growth which comprises treating soil, before planting the desired crop therein, with 1,4-dichloro-2-butyne in a concentration and amount sufficient to so improve the soil.

References Cited in the file of this patent

UNITED STATES PATENTS 2,057,044   Meisenburg et al. _____ Oct. 13, 1936

FOREIGN PATENTS 595,539   Great Britain _____ Dec. 8, 1947